R. P. LEHR.
INTERNAL COMBUSTION ENGINE VALVE.
APPLICATION FILED MAR. 23, 1912.

1,122,618.

Patented Dec. 29, 1914.
3 SHEETS—SHEET 1

Witnesses:
R. S. Berry,
Thos. Castberg.

Inventor
Robert P. Lehr
By G. H. Strong
Atty

R. P. LEHR.
INTERNAL COMBUSTION ENGINE VALVE.
APPLICATION FILED MAR. 23, 1912.

1,122,618.

Patented Dec. 29, 1914.
3 SHEETS—SHEET 3.

Witnesses:

Inventor
Robert P. Lehr
By J. H. Strong
Atty.

United States Patent Office.

ROBERT P. LEHR, OF SAN JOSE, CALIFORNIA.

INTERNAL-COMBUSTION-ENGINE VALVE.

1,122,818.　　　Specification of Letters Patent.　　Patented Dec. 29, 1914.

Application filed March 28, 1912. Serial No. 685,785.

*To all whom it may concern:*

Be it known that I, ROBERT P. LEHR, a citizen of the United States, residing at San Jose, in the county of Santa Clara and State of California, have invented new and useful Improvements in Internal-Combustion-Engine Valves, of which the following is a specification.

This invention relates to an internal combustion engine, and particularly pertains to a rotary sleeve valve for controlling the admission of explosive gases to the engine cylinder and the discharge of the burnt gases therefrom.

It is the object of this invention to provide a rotary sleeve valve for internal combustion engines which is simple in construction and operation, efficient and reliable, and which is particularly adapted for controlling the inlet and exhaust ports of a pair of engine cylinders at one time.

Another object is to provide a means for adjusting the sleeve valve so as to compensate for wear of its bearing surface and insure a close contact between the valve and the valve casing or seat.

The invention consists of the parts and the construction and combination of parts as hereinafter more fully described and claimed, having reference to the accompanying drawings, in which—

Figure 1:
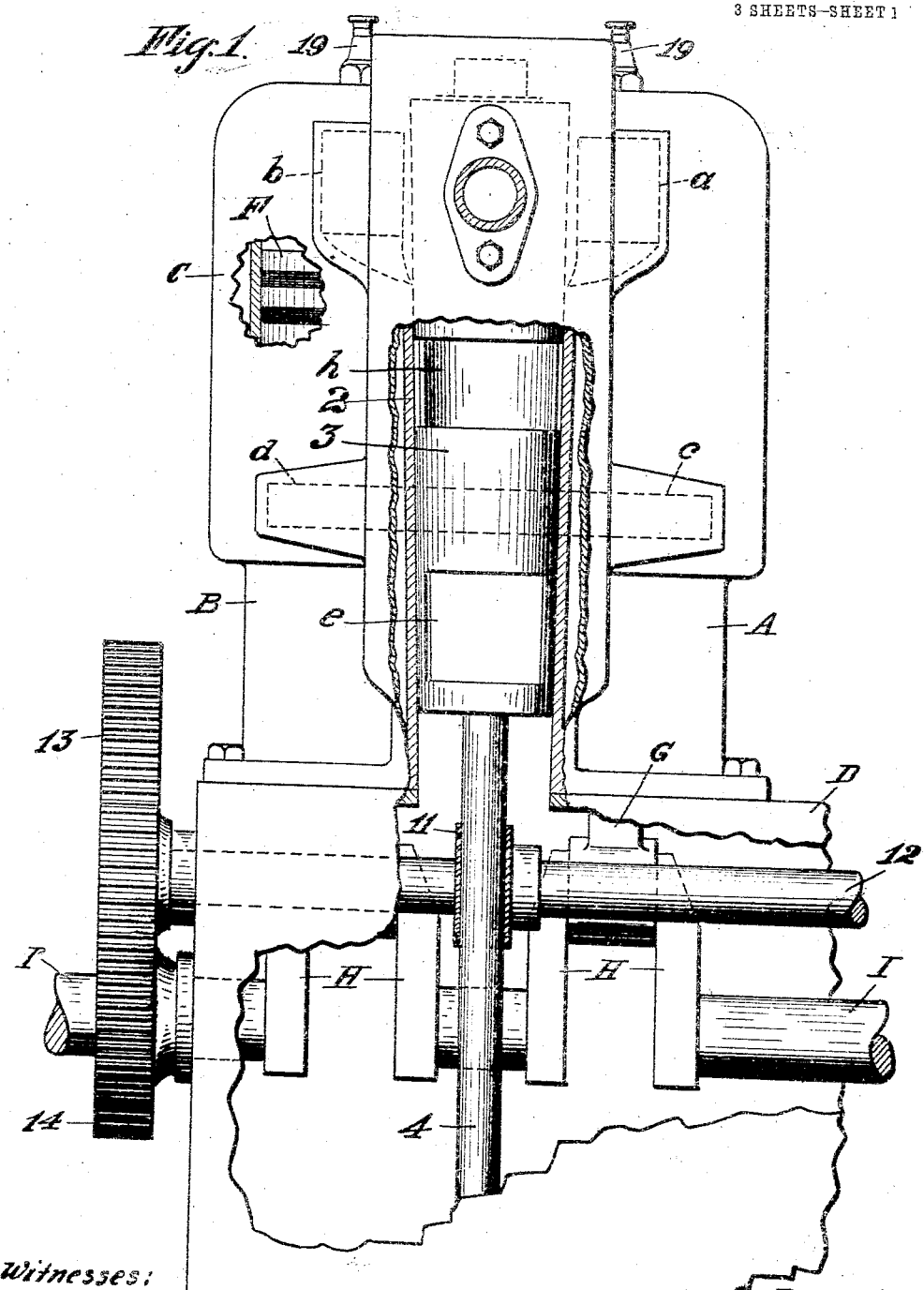
Figure 2:
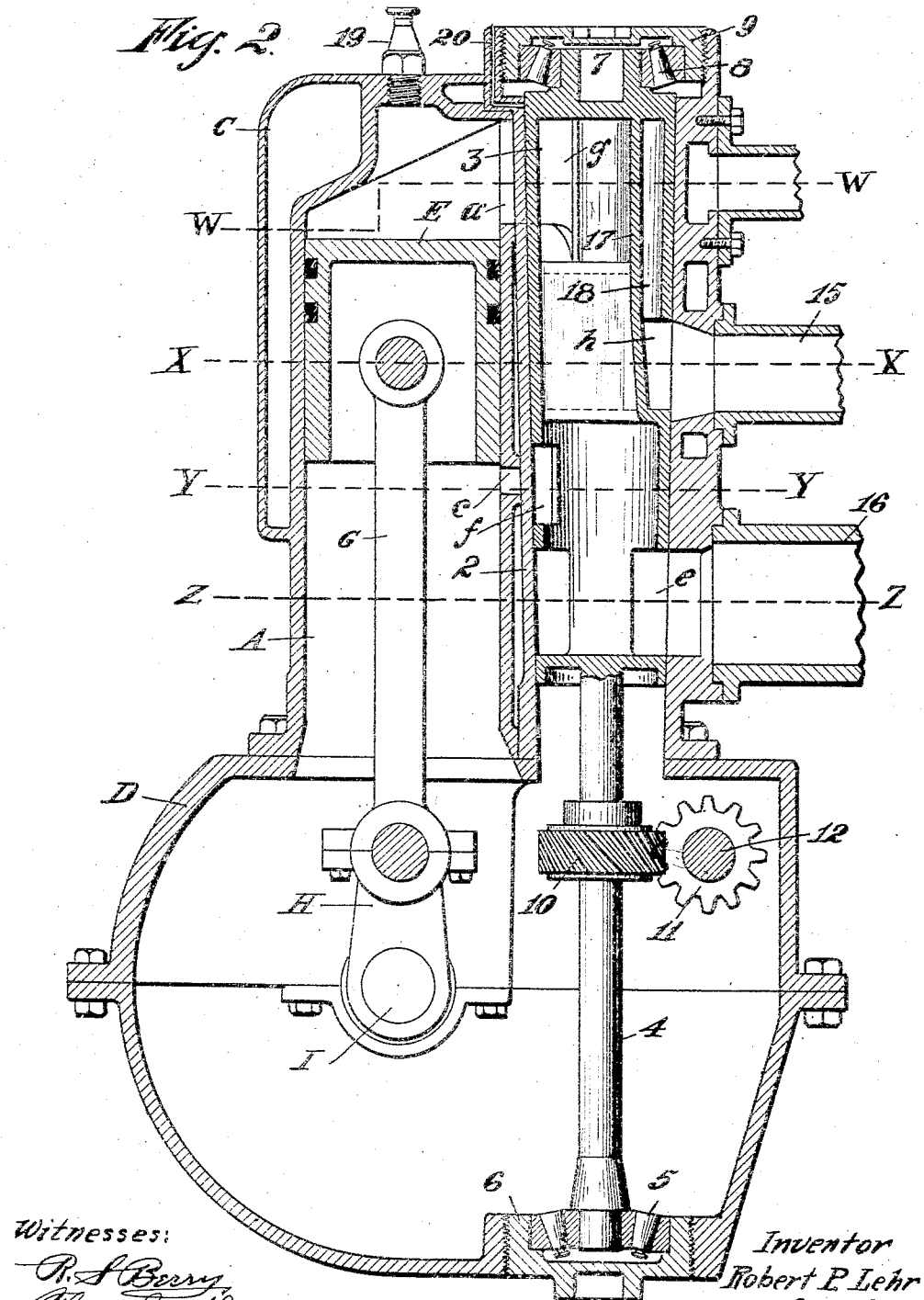
Figure 3:
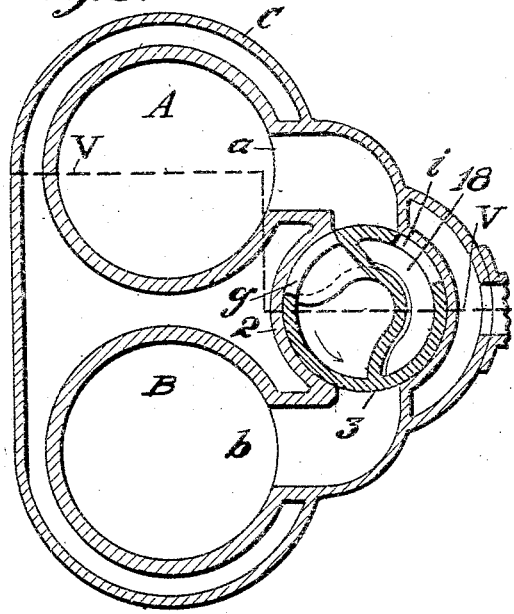
Figure 4:
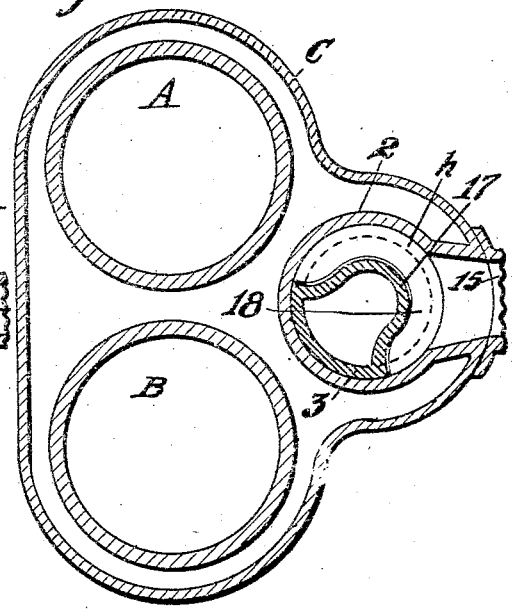
Figure 5:
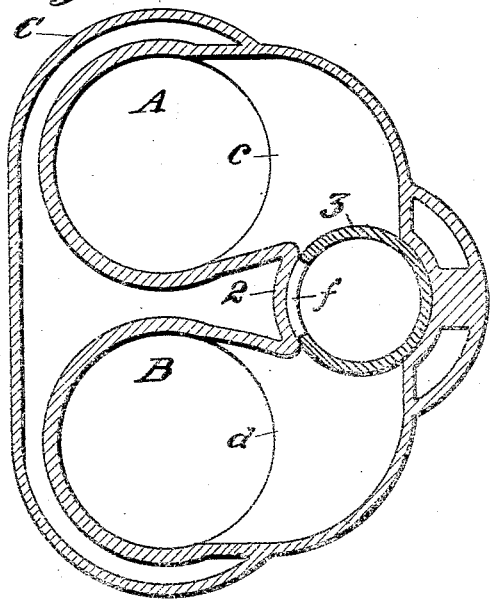
Figure 6:
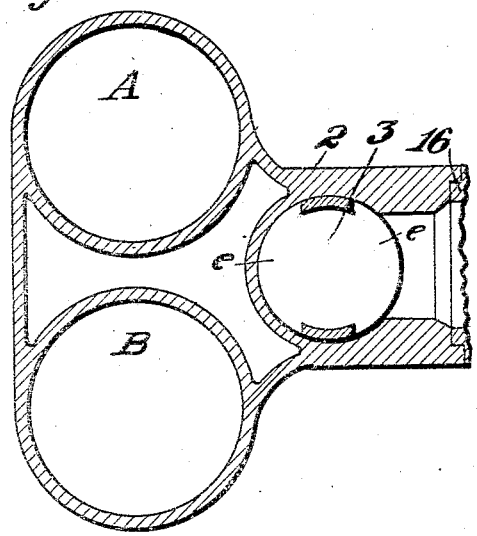

Figure 1 is a view in front elevation of an engine constructed in accordance with this invention, with parts broken away. Fig. 2 is a vertical transverse section of the engine and valve on the line V—V of Fig. 3. Fig. 3 is a horizontal section on the line W—W, of Fig. 2. Fig. 4 is a horizontal section on the line X—X, Fig. 2. Fig. 5 is a horizontal section on the line Y—Y, Fig. 2. Fig. 6 is a horizontal section on the line Z—Z, Fig. 2.

In the drawings A—B represent a pair of slightly separated, parallel engine cylinders which are surrounded by a water jacket casing C and are supported upon a crank case D in the usual manner. Mounted in the engine cylinders A—B are pistons E—F, to which piston rods G are attached; the piston rods G connecting with similarly extending cranks H on a crank shaft I mounted in the crank case D, in the manner common in internal combustion engines.

Formed on the engine cylinders A—B at some convenient point therebetween is a tapered tubular valve casing 2 which is inclosed in the water jacket casing C. The longitudinal axis of the valve casing 2 parallels the longitudinal axes of the engine cylinders A—B; the upper end of the valve casing terminating adjacent the upper end of the engine cylinders A—B, while the lower end opens into the crank case D, as shown in Fig. 2.

Revolubly mounted in the valve casing 2 is a tapered valve sleeve 3, the outer peripheral face of which is designed to slidably contact the inner circumferential face of the valve casing 2. The valve sleeve is closed at its upper and lower ends, and extends from a point adjacent the upper end of the valve casing 2 to a point near the lower end thereof. Connected to the lower end of the sleeve 3 is a vertically extending shaft 4 which is supported at its lower end on end thrust roller bearings 5 mounted in a plate 6 threaded for adjustment in the bottom of the crank case D.

The upper end of the valve sleeve 3 is formed with a vertically extending hub 7 which is disposed to rotate in end thrust bearings 8 mounted in a cap 9 threaded for adjustment in the upper end of the valve casing 2, as shown in Fig. 2. The plate 6 and the cap 9 are designed to be adjusted vertically in their threaded mountings to regulate the contact of the outer surface of the valve against the inner surface of the valve casing, this construction admitting of the valve being adjusted in event of its becoming worn, to bring it into proper contact with its casing. The valve 3 may be inserted in, or withdrawn from, the valve casing 2 by removing the cap 9.

Mounted on the shaft 4 is a spiral gear 10 which meshes with a similar spiral gear 11 on a horizontally extending shaft 12, which shaft 12 is mounted to rotate in the ends of the crank case D and extends longitudinally therethrough. A toothed wheel 13 on the shaft 12 exterior of the crank case meshes with a toothed wheel 14, one-half of the diameter of the wheel 13 which is mounted on the crank shaft I, in such manner that when the crank shaft I is rotated two revolutions, the shaft 12 and the shaft 4 with the valve sleeve 3 thereon will rotate one revolution.

Formed in the side walls of the engine cylinders A—B adjacent the upper ends thereof, are ports *a*—*b*, which ports open to the interior of the valve casing adjacent its upper end on diametrically opposite sides thereof, as shown in Fig. 3; a passage being formed in the engine casing leading from the cylinder A to one side of the valve casing and a similar passage being formed between the cylinder B and the other side of the valve casing.

Ports c—d are formed in the side walls of the engine cylinders A—B at a point above the pistons E—F, when the latter are in their lowermost positions; the ports c—d communicating with the interior of the valve casing 2 on opposite sides thereof, as shown in Fig. 5, some distance below the ports a—b.

A gas inlet pipe 15, leading from any suitable source of gas supply, opens to the interior of the valve casing 2, at a point approximately midway between the ports a—b and the ports c—d, and at right angles thereto, as shown in Figs. 2 and 4. Leading from the valve casing 2 adjacent its lower end is an exhaust pipe 16, which is designed to be constantly in communication with the interior of the valve 3, for which purpose the side walls of the valve 3 adjacent its lower end are cut away to form openings e of large area, as shown in Fig. 6.

Formed on one side of the valve 3 is a port f which is positioned to register alternately with the ports c—d, so as to successively open and close the ports when the valve 3 is revolved; the port f forming a means of communication between the interior of the engine cylinders and the atmosphere through the exhaust pipe 16. A similar port g is formed in the side wall of the valve 3 adjacent its upper end which is designed to register alternately with the ports a—b, to open communication between the upper ends of the cylinders A—B and the atmosphere through the interior of the valve 3 and the exhaust pipe 16.

An inlet port h is provided in the wall of the valve 3 in alinement with the inlet or feed pipe 15, this port extending circumferentially around the valve approximately three-fourths of its periphery, as shown in Fig. 4. A partition wall 17 is formed in the valve 3 in such manner as to form a chamber or passage 18 separate from the interior of the valve; the passage 18 leading from the port h to the upper end of the valve and opening to the interior of the valve through a port i formed in the wall of the valve adjacent to its upper end, in alinement with the ports a—b, as shown in Fig. 3.

In the operation of this invention an explosive mixture is delivered continuously to the feed pipe 15 from any suitable source of supply; the engine then being started so as to reciprocate the pistons E—F in their respective cylinders A—B and rotate the valve 3 in the valve casing 2.

For the purpose of explanation, let it be assumed that the piston E is in its uppermost position, as shown in Fig. 2, and about to travel downward on the charging or intake stroke. The valve 3 will then be positioned, as shown in Figs. 3, 4, 5 and 6, in which position the port i will be so disposed as to begin to open the port a as the piston E moves downward; the valve 3 rotating in the direction of the arrow in Fig. 3. At this point the piston F in the cylinder B will also be in its uppermost position and about to move downward on the power or driving stroke; the ports b and d in the cylinder B being closed by the imperforate portions of the walls of the valve 3 during this downward stroke of the piston F.

The piston E in moving downward will draw a quantity of the explosive mixture into the cylinder A through the ports a—i, passage 18, and port h from the feed pipe 15. The moment the pistons E and F reach their lowermost positions, the valve 3 will have moved sufficiently far to carry the port i beyond the port a, thereby closing the latter before the piston E starts on its upward or compression stroke; the port d in the cylinder B being opened by the port f in the valve 3, as the piston F nears its lowermost position in moving downward, to permit of the escape of a portion of the burnt gases now above the piston F into the interior of the valve 3 and from thence to the atmosphere through openings e and the pipe 16. The piston E is now disposed in its lowermost position and the space thereabove in the cylinder A is filled with the explosive mixture; the piston F being in its lowermost position and the burnt gases thereabove in the cylinder B about to be discharged into the interior of the valve 3. The piston E now moves upward to compress the explosive mixture thereabove, and the piston F moves upward to discharge the remainder of the burnt gases in the cylinder B into the interior of the valve 3; the latter being so positioned as to dispose the port g therein to register with the port b in the cylinder B and to close the ports a and c in the cylinder A. When the piston E has reached its uppermost position, on this stroke, the explosive mixture thereabove will have become greatly compressed in the upper end of the cylinder A. This compressed mixture will then be exploded by means of a spark plug 19, or in any other suitable manner, thereby expanding the mixture and forcing the piston E downward with considerable force, in the manner common to four cycle engines, thereby rotating the shaft I through the piston rod G and crank H, and also driving the piston F down on its intake stroke, through its connections with the shaft I; the port i in the valve 3 opening to the port b in the cylinder B the moment the piston F reaches its uppermost position. The valve 3 will be so disposed as to close the ports a, c and d in the cylinders A—B. The piston E will now return on its exhaust stroke; the ports $a$ and $c$ in the cylinder A being brought into register with the ports $g$ and $f$ in the valve 3; the piston E traveling to its uppermost position in the cylinder A in readiness to draw another charge into the cylinder; and the piston F returning on its compression stroke to compress the charge thereabove preparatory to exploding same, which is accomplished by means of a spark plug 19 in the manner described in reference to the cylinder A, thus completing one round of operations of the engine. The pistons E—F will now have each made four strokes or cycles; the shaft I will have made two revolutions; and the sleeve valve 3 will have made one revolution, which operation is now repeated in the continuous operation of the engine.

By delivering an oil or other suitable lubricant to the contacting faces of the valve 3 and its casing 2 at a point adjacent to the upper end of the valve, the wear of these surfaces will be greatly reduced. For this purpose an oil inlet passage 20 is formed in the engine casing, as shown in Fig. 2.

By inclosing the valve casing 2 in the water jacket C, the valve cylinder 2 and the valve 3 may be cooled to reduce expansion due to the hot gases passing therethrough.

It is manifest that any number of pairs of engine cylinders A—B, with a valve 3 for each pair, may be mounted to operate on one drive-shaft I as may be desired.

An important feature of this invention lies in the arrangement of the inlet passage 18 in the valve 3 in such manner that the hot exhaust gases in passing through the interior of the valve will act to super-heat the explosive charge before it enters the engine cylinders, thereby increasing the combustible qualities of the charge. Another feature is the provision of the auxiliary exhaust ports $c$—$d$ and $f$, which are designed to open the engine cylinders adjacent to the upper ends of the pistons while the latter are moving downward on the driving strokes at the moment the power of the explosion of the charge in the cylinders has been expended. This arrangement facilitates the scavenging of the burnt charge.

By the arrangement and construction of the sleeve valve 3 and its adjustable mounting in end-thrust bearings, constituting the essential part of this invention, a large port area is obtained so as to offer little resistance to the engine in drawing in the explosive charge and exhausting the burnt gases, and also admitting of easy removal and adjustment of the valve in relation to its casing.

Having thus described my invention, what I claim and desire to secure by Letters Patent is—

1. In an internal combustion engine, the combination, with a cylinder, a piston working therein, and inlet and exhaust pipes; of a valve casing arranged adjacent to and parallel with the cylinder and having upper and lower ports which communicate respectively, with the upper end of said cylinder and with the intermediate portion thereof at a point just above the piston when in its lowermost position; a hollow, rotary sleeve valve disposed within said casing for controlling the opening and closing of said ports, and in port communication at its lower end with the exhaust pipe, said valve having a partition wall adapted to form a passage separate from the interior of the valve and in communication at its lower end with the inlet pipe, and also having upper and lower ports adapted to open and close the corresponding cylinder ports during the rotation of the valve; and means for rotating said valve.

2. In an internal combustion engine, the combination, with a cylinder, a piston working therein, and inlet and exhaust pipes; of a valve casing arranged adjacent to and parallel with the cylinder and having upper and lower ports which communicate respectively, with the upper end of said cylinder, and with the intermediate portion thereof at a point just above the piston when in its lowermost position; a hollow, rotary sleeve valve disposed within said casing, and having within it a partition which divides its interior longitudinally into two compartments each communicating adjacent its upper end with the upper cylinder port, one of said compartments communicating with the inlet pipe, and the other compartment with the exhaust pipe, the lower portion of said valve being provided with a port which is adapted to alternately open and close the upper cylinder port during the rotation of the valve and which communicates with the said other compartment; and means for rotating said valve.

In testimony whereof I have hereunto set my hand in the presence of two subscribing witnesses.

ROBERT P. LEHR.

Witnesses:
  FREDERICK W. PALMER,
  ADDISON B. BURBANK.